(12) United States Patent
Hallberg et al.

(10) Patent No.: US 12,186,876 B2
(45) Date of Patent: Jan. 7, 2025

(54) POWER TOOL AND TWO-SPEED GEAR ASSEMBLY FOR A POWER TOOL

(71) Applicant: ATLAS COPCO INDUSTRIAL TECHNIQUE AB, Stockholm (SE)

(72) Inventors: Daniel Hallberg, Sundbyberg (SE); Johan Rönblom, Saltsjö-Boo (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 167 days.

(21) Appl. No.: 17/767,169

(22) PCT Filed: Oct. 15, 2020

(86) PCT No.: PCT/EP2020/079086
§ 371 (c)(1),
(2) Date: Apr. 7, 2022

(87) PCT Pub. No.: WO2021/083680
PCT Pub. Date: May 6, 2021

(65) Prior Publication Data
US 2022/0410361 A1    Dec. 29, 2022

(30) Foreign Application Priority Data
Oct. 31, 2019    (SE) .................................... 1930352-8

(51) Int. Cl.
*B25F 5/00*    (2006.01)
(52) U.S. Cl.
CPC .................................... *B25F 5/001* (2013.01)
(58) Field of Classification Search
None
See application file for complete search history.

(56) References Cited

U.S. PATENT DOCUMENTS 3,739,659 A    6/1973    Workman
4,650,007 A    3/1987    Fujita et al.
(Continued)

FOREIGN PATENT DOCUMENTS

| EP | 0226426 A2 | 6/1987 |
| EP | 0787931 A1 | 8/1997 |
| EP | 2708329 A1 | 3/2014 |

OTHER PUBLICATIONS

Atlas Copco Industrial Technique Ab, Swedish Patent Application No. 1930352-8, Search Report, May 26, 2020.
(Continued)

*Primary Examiner* — Chinyere J Rushing-Tucker
(74) *Attorney, Agent, or Firm* — Moore & Van Allen PLLC; W. Kevin Ransom

(57) ABSTRACT

The present specification relates to a power tool comprising an input shaft and an output shaft and a two-speed power transmission comprising a planetary gear and a gear shift assembly for directing torque through or past the planetary gear comprising a driving member, a driven member and an axially movable coupling sleeve arranged to intercouple in a first position the driving member and the driven member and to intercouple in a second position the planetary gear and the driven member. A linear actuator is arranged to displace the coupling sleeve between the first and second position, wherein the linear actuator comprises a linearly movable push bar arranged for displacing the coupling sleeve. The present specification also relates to a method in and a two-speed power transmission for such a power tool.

13 Claims, 1 Drawing Sheet

(56) References Cited

U.S. PATENT DOCUMENTS

| | | |
|---|---|---|
| 5,782,593 A | 7/1998 | Klement |
| 2007/0251359 A1 | 11/2007 | Junkers et al. |
| 2009/0071673 A1 | 3/2009 | Zhong |
| 2016/0184983 A1* | 6/2016 | McGougan ............. B25B 21/00 173/216 |

OTHER PUBLICATIONS

Atlas Copco Industrial Technique AB, European Patent Application No. 20793613.9, Communication pursuant to Article 94(3) EPC, May 11, 2023.

Atlas Copco Industrial Technique AB, International Patent Application No. PCT/EP2020/079086, International Search Report, Jan. 27, 2021.

Atlas Copco Industrial Technique AB, International Patent Application No. PCT/EP2020/079086, Written Opinion, Jan. 27, 2021.

Atlas Copco Industrial Technique AB, International Patent Application No. PCT/EP2020/079086, International Preliminary Report on Patentability, Feb. 4, 2022.

* cited by examiner

POWER TOOL AND TWO-SPEED GEAR ASSEMBLY FOR A POWER TOOL

CROSS-REFERENCE TO RELATED APPLICATIONS

This application is a National Stage Patent Application (filed under 35 § U.S.C. 371) of PCT/EP2020/079086, filed Oct. 15, 2020 of the same title, which, in turn claims priority to Swedish Patent Application No. 1930352-8 filed Oct. 31, 2019 of the same title; the contents of each of which are hereby incorporated by reference.

FIELD OF THE INVENTION

The present invention generally relates to a power tool, more particularly to a power tool comprising a two-speed gear assembly.

BACKGROUND OF THE INVENTION

Different types of power tools are known to be used in various industries, where one common type is tightening tools used for tightening of screws or bolts.

One problem known to cause various design challenges in the field is that the working conditions and the requirements on the expected output tend to vary a lot during use, such as for example with regards to the speed and torque required during different parts of a typical working operation. This is the case for example for the tightening tools mentioned above, as during tightening of screws or nuts during the initial phase of the tightening, i.e. the so called run down, the torque needed is low whereas the rotation speed should ideally be high in order to reduce the time required for the operation, whereas during the actual tightening phase, i.e. during the actual tightening of the joint, the torque required is higher.

Power tools subjected to these types of varying requirements are however known to, in order to be able to provide the desired torque levels, include one or more transmissions such as for example one or more planetary gear steps connected in series.

But, using such transmissions to achieve the high torque levels required for actual tightening, the rotational speed provided decreases correspondingly, thus resulting in an undesired low rotational speed during run down. This becomes a significant problem particularly in the field of power tools adapted to tighten large screws to very high torque values, where commonly a very low revolutions per minute (RPM) results from the provision of the desired high torque, which in turn commonly makes the rundown phase unreasonably slow.

In order to alleviate some of these problems, attempts have therefore been made to use two-speed power transmissions, i.e. transmissions where the force flow through the gear unit may be altered such that a higher rotational speed may be used during run down and the high torque/low speed mode only when needed during actual tightening.

However, there are many problems associated with such transmissions. For example, one known problem is lack of control of the actual advance of the shifting operation, i.e. knowing if the shifting has in fact taken place correctly. Such lack of precise control over the actual current position of the gear elements may result in destroyed gears and couplings.

Solutions have been proposed involving complex mechanism comprising synchronizing rings or bulky sensors, making the design complex as such and commonly requiring a lot of space. Hence, there exists a need for improvement in the field of two-speed gear units for power tools.

SUMMARY OF THE INVENTION

Accordingly, it would be desirable to provide a power tool having an improved two speed transmission. In particular, it would be desirable to provide a transmission providing improved possibilities for controlling the gear shifting. To better address one or more of these concerns, a gear unit for a tightening tool, a power tool comprising such a gear unit, and a method for controlling such a power tool as defined in the independent claims is provided. Preferred embodiments are defined in the dependent claims.

According to a first aspect of the invention, a power tool comprising a two-speed power transmission is provided, the tool comprising a housing, an input shaft, an output shaft and a two-speed power transmission, the two-speed power transmission comprising a planetary gear and a two speed gear shift assembly for directing torque through the planetary gear in a high torque/low speed drive mode or past the planetary gear in a low torque/high speed drive mode. The gear shift assembly comprising a driving member drivingly connected to the input shaft, a driven member drivingly connected to the output shaft, an axially movable coupling sleeve arranged to intercouple in a first position the driving member and the driven member and to intercouple in a second position the planetary gear and the driven member, and a linear actuator arranged to displace an axially movable coupling sleeve between the first and second positions, wherein the linear actuator comprises a linearly movable push bar arranged to displace the coupling sleeve between the first and second positions.

According to the first aspect, the two-speed transmission provides an inventive solution to the concerns described above by means of a design incorporating a gear shift mechanism directing torque through a planetary gear step in a high torque/low speed drive mode or past the planetary gear in a low torque/high speed drive mode, where improved possibilities to accurately control the gear shifting is provided by means of the utilization of a coupling sleeve displaced by a linear actuator.

More particularly, as the linear actuator is arranged to displace the coupling sleeve, the engagement in the respective modes of operation (or lack thereof) may be determined based on the position of the linear actuator. The design therefore cleverly provides a two-speed power transmission capable of providing precise and accurate control of the gear shifting.

According to one embodiment, the power tool further comprises a motor and means for monitoring the torque delivered by the tool. The means for monitoring a torque delivered by the tool may comprise, for example, a sensor such as a torque transducer. Other examples include circuitry adapted to monitor the motor current or other internally provided data related to the performance of the motor. The power tool may also form part of a system comprising the power tool and an external control unit operative to control the power tool.

With regards to the power tool as such, according to one embodiment, the motor is an electric motor. The tool may, for example, be an electrical hand-held power tool chosen from the group comprising a screw driver, a nut runner, a drill, and a grinder. The skilled person, however, realizes that only slight modification of the structure would be required for use with stationary or fixtured tools. In some embodiments, the power tool may be a battery powered tool. In one embodiment, the power tool is a tool providing a higher tightening torque, for example in the range 2400-8000 Nm.

According to one embodiment, the gear assembly further comprises a coupling assembly arranged between the coupling sleeve and the linear actuator, the coupling assembly comprising a first element rotationally coupled to the sleeve and a second element translationally coupled to the push bar, wherein a rotation of the first element is independent of a rotation of the second element and wherein the second element is arranged to push the first element in an axial direction. Hereby, the rotation of the sleeve and hence the motor does not affect the linear actuator and the adjustment of the axial position of the sleeve may take place independently of the rotation. The second element may form part of the push bar.

In one embodiment, the gear assembly further comprises a coupling assembly arranged to couple (i.e. link or connect) the coupling sleeve and the linear actuator, the coupling assembly comprising a first element rotationally coupled to the sleeve and a second element translationally coupled to the push bar, wherein a rotation of the first element is independent of a rotation of the second element and wherein the second element is arranged to push the first element in an axial direction. Hereby, the rotation of the sleeve and hence the motor does not affect the linear actuator and the adjustment of the axial position of the sleeve may take place independently of the rotation. The second element may form part of the push bar and/or be formed by the push bar.

According to one embodiment, the coupling sleeve is concentrically arranged with respect to the planetary gear, wherein the second element is adapted to engage the first element in a position lying in a center of the sleeve. This arrangement provides a compact space saving design. Further, such a design further simplifies the bearing arrangements required.

According to one embodiment, the first element is a ball arranged at least partly in the sleeve, wherein the second element arranged to push the ball is formed by the push bar. Hereby, the end of the push bar may bear against the rotating bar to displace the sleeve. The ball may for example be arranged at the end of the sleeve facing the linear actuator, for example by means of a press fit or similar.

According to one embodiment, the gear assembly further comprises a coupling assembly arranged between the coupling sleeve and the linear actuator, the coupling assembly comprising a first element rotationally coupled to the sleeve, wherein a rotation of the first element is independent of a rotation of the push bar and wherein the push bar is arranged to push the first element in an axial direction. Hereby, the rotation of the sleeve and hence the motor does not affect the linear actuator and the adjustment of the axial position of the sleeve may take place independently of the rotation. In one embodiment, the coupling sleeve is concentrically arranged with respect to the planetary gear and the push bar is adapted to engage the first element in a position lying in a center of the sleeve. In one embodiment, the first element is a ball arranged at least partly in the sleeve.

In one embodiment, the coupling further comprises a second element translationally coupled to said push bar and adapted to engage said first element, wherein a rotation of said first element is independent of a rotation of said push bar and wherein said push bar is arranged to push said first element in an axial direction by means of pushing said second element.

According to one embodiment, a first axially acting spring means is arranged for biasing the coupling sleeve toward the first position of the coupling sleeve. Examples include a compression spring arranged to bear against, for example, a suitable portion of the housing and acting on a second end of the sleeve.

According to one embodiment, the first and second position is a first and second end position respectively, wherein the coupling sleeve is continuously movable there between and may be positioned at any position between the first and second end position. Or, in other words, the push bar of the linear actuator may be positioned at any position between a first and second end position. Preferably, the position of the push bar may be monitored over the whole interval.

According to one embodiment, the driven member comprises a first engaging portion adapted to engage a corresponding congruent first portion of the coupling sleeve, and wherein the planetary gear comprises a planet wheel carrier comprising a second engaging portion adapted to engage a corresponding congruent second portion of the coupling sleeve. For example, according to one embodiment, at least one of the first and second engaging portions have a polygonal shape where examples include a square- or hex shaped cross section.

According to one embodiment, the planetary gear is a first planetary gear step. According to one embodiment, the power tool further comprises a front gear unit, or second stage gear unit. In such an embodiment the inventive transmission may be arranged between the motor and the front- or second stage gear unit, such that the driven member of the transmission engages the front gear, i.e. is drivingly connected to the output shaft via the front gear. This is advantageous in that the front gear unit for such a tool may be an interchangeable front gear unit, such that the front gear unit may be changed depending on the desired torque while the two speed transmission remains in or on the tool.

According to one embodiment, the power tool further comprises a bevel gear arranged between the input shaft and the driving member, such that the driving member is connected to the input shaft via the bevel gear. This may be advantageous in that, due to the change of direction of the power train at the bevel gear, a design where the centered push bar described above may be more easily realized may be achieved.

According to one embodiment, the linear actuator is a linear motor. For example a DC servo motor comprising a solid stator housing, a coil assembly, and a multi-pole magnetic push bar.

According to one embodiment, the linear actuator comprises at least one internal position sensor configure to sense a position of the push bar. Examples include an internal hall-sensor. Hereby, the position of the push bar may be continuously determined and monitored. In one embodiment, the liner motor further comprises a control unit configured to for example monitor and control the movement of the push bar as well as communicate with, for example, an external control unit configured to control the power tool.

According to a second aspect of the present invention, a two-speed power transmission for a power tool according to any of the embodiments described above is provided, the transmission comprising a planetary gear and a two speed gear shift assembly for directing torque through the planetary gear in a high torque/low speed drive mode or past the planetary gear in a low torque/high speed drive mode. The gear shift assembly comprising a driving member drivingly connected to the input shaft, a driven member drivingly connected to the output shaft, a coupling sleeve arranged to intercouple in a first position the driving member and the driven member and to intercouple in a second position the planet wheel carrier and the driven member, and a linear actuator arranged to displace the coupling sleeve between the first and second positions, wherein the linear actuator is a linear actuator comprising a linearly movable push bar arranged to displace said coupling sleeve between said first and second positions.

Objectives, advantages and features of the transmission conceivable within the scope of the second aspect of the invention are readily understood by the foregoing discussion referring to the first aspect of the invention.

According to a third aspect of the present invention, a method for controlling a power tool comprising a planetary gear and a two speed gear shift assembly for directing torque through the planetary gear in a high torque/low speed drive mode or past the planetary gear in a low torque/high speed drive mode by means of a coupling sleeve and a linear actuator arranged to displace the coupling sleeve, the method comprising the steps of running the tool in the low torque/high speed drive mode of operation in which the coupling sleeve is arranged in a first position directing torque past the planetary gear, identifying that snug has been reached, displacing the coupling sleeve forwards by an axial movement in a first direction by means of the linear actuator to arrive at the second position and running the tool in the high torque/low speed drive mode of operation in which the coupling sleeve is arranged in the second position directing torque through the planetary gear.

According to one embodiment, the method is a method in a power tool comprising a two speed transmission according to any of the embodiments described in the foregoing, the method comprising the steps of running the tool in the low torque/high speed drive mode of operation in which the coupling sleeve is arranged in said first position intercoupling said driving member and driven member, identifying that snug has been reached, displacing said coupling sleeve forwards by an axial movement in a first direction by means of said linear actuator to arrive at said second position and running the tool in the high torque/low speed drive mode of operation in which the coupling sleeve is arranged in the second position intercoupling said planet wheel carrier and said driven member. The term displacement forwards should be understood to be a direction towards the end of the output shaft where a socket or similar implement will be engaged.

When run down (i.e. low torque/high speed mode) starts, the push bar and hence the coupling sleeve are in the first, i.e. back position where the coupling sleeve connects the driving member with the output shaft. Run down ends when snug is reached. This may, for example, be identified by a passing of a current limit threshold. Snug, for the sake of completeness, is the point in where the run down phase passes into the actual tightening phase. These tightening conditions may be monitored, for example, by an external control unit. This is followed by a signal to the linear actuator that run down is complete, and forward displacement of the push bar and hence the coupling sleeve begins towards the second position. As the coupling sleeve engages the planetary gear, i.e. is positioned at said second position, a signal may be sent for example to the external control unit indicating that low speed gear is in position. Now, the final and actual tightening phase (i.e. high torque/low speed) may start.

According to one embodiment, the step of arriving at the second position further comprises, if the coupling sleeve fails to engage the planetary gear, effecting a displacement backwards by an axial movement in a second opposite direction of the linear actuator backwards, effecting a rotation of the planetary gear, and moving the coupling sleeve forwards by an axial movement in the first direction by means of the linear actuator to arrive at the second position.

According to one embodiment, the method is a method in a power tool comprising a two speed transmission according to any of the embodiments described in the foregoing and the step of arriving at the second position further comprises if the coupling sleeve fails to engage the planet wheel carrier, effecting a displacement backwards by an axial movement in a second opposite direction of the linear actuator backwards, effecting a rotation of the driving member and moving the coupling sleeve forwards by an axial movement in the first direction by means of the linear actuator to arrive at the second position.

If the push bar fails to reach the front or first position due to, for example, a rotational miss-match between the cross section of the sleeve and the corresponding surfaces of the planetary gear to be engaged, the direction of axial movement is reversed and the push bar moves back a small distance and, possibly simultaneously, the motor rotates the planet carrier to allow for a new position for the coupling sleeve to engage. Hereby, the change between the drive modes of the transmission may be facilitated.

In one embodiment, the method may further comprise the steps of identifying that a target torque has been reached and displacing the coupling sleeve backwards by an axial movement in a second direction by means of the linear actuator to return to the first position. For example, the torque may be monitored by means of e.g. a torque transducer, and when the desired torque is reached, the linear actuator receives a signal and returns to engage high speed/low torque mode again. This movement of the coupling sleeve may be followed by a, or combined with a simultaneous, rotation of the motor to help the coupling sleeve to engage properly as described above.

Objectives, advantages and features of the method conceivable within the scope of the third aspect of the invention are readily understood by the foregoing discussion referring to the second aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION

Figure 1:
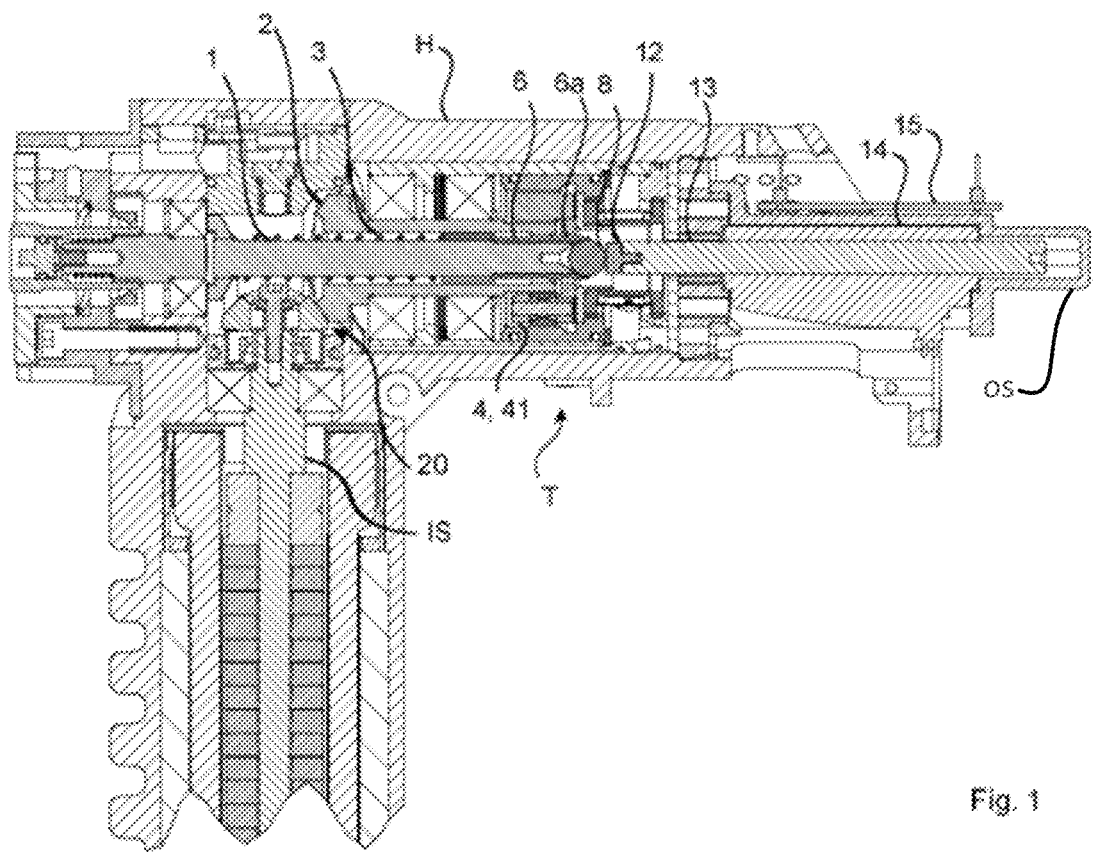
FIG. 1 is a cross sectional view of an exemplary power tool comprising a two-speed power transmission according to one embodiment.

FIG. 1 is a cross sectional view of a portion of an exemplary power tool according to one embodiment, in this case a handheld tightening tool. The tool comprises a housing H, an input shaft IS, a motor connected to the driving member 2 via a bevel gear 20, an output shaft OS and a two-speed transmission T arranged between the input shaft IS and the output shaft OS. Further, the tool is connected to an external control unit operative to control the rotational speed of the motor which will be described in greater detail below when describing the functionality of the tool.

The two-speed power transmission T of the embodiment shown in FIG. 1 comprises a planetary gear 4 and a gear shift assembly for directing torque from the input shaft IS to the output shaft OS through the planetary gear 4 in a high torque/low speed drive mode or past the planetary gear 4 in a low torque/high speed drive mode. The transmission T is shown in FIG. 1 in the low torque/high speed drive mode.

The planetary gear 4 comprises a ring gear (or gear rim) secured in the housing H and a planet wheel carrier 41. The transmission assembly comprises a driving member 2, in the illustrated embodiment forming part of the bevel gear 20, and a driven member 1 drivingly connected to the output shaft OS.

A coupling sleeve 6 is axially movable between a first position where the sleeve intercouples the driving member 2 and the driven member 1, i.e. the low torque/high speed mode illustrated in FIG. 1, and a second position intercoupling the planetary gear 4, more particularly the planet carrier 4a, with the driven member 1.

A linear actuator 13, 14 is used to displace the coupling sleeve 6 between said first and second positions, more particularly, in the illustrated embodiment, a linear DC servo motor comprising a solid stator housing 14, a coil assembly, and a linearly movable multi-pole magnetic push bar 13 arranged to push the coupling sleeve 6 from the first to the second position. The linear actuator further comprises an internal hall sensor configured to sense a position of the push bar 13 and an internal control unit or controller board 15. A compression spring 3 is arranged to bias the coupling sleeve 6 toward the first position.

In the illustrated embodiment, the push bar 13 engages a second element 12 of a coupling assembly arranged between the coupling sleeve 6 and the linear actuator 13, 14. The second element 12 in the illustrated embodiment forms part of the push bar. This coupling assembly further comprises a first element 8 in the form of a ball 8 arranged in the sleeve 6 at a first end 6a thereof and hence rotating along with the coupling sleeve 6. The rotation of the sleeve 6 is independent from the rotation of the push bar 13 of the linear actuator (and hence that of the second element 12 forming part of the push bar 13). The ball 8 has a suitable size to fit the end 6a of the coupling sleeve 6 and the push bar 13 is arranged to engage the ball (i.e. push) in a position lying in the center of said sleeve (i.e. via the second element 12).

Figure 2:
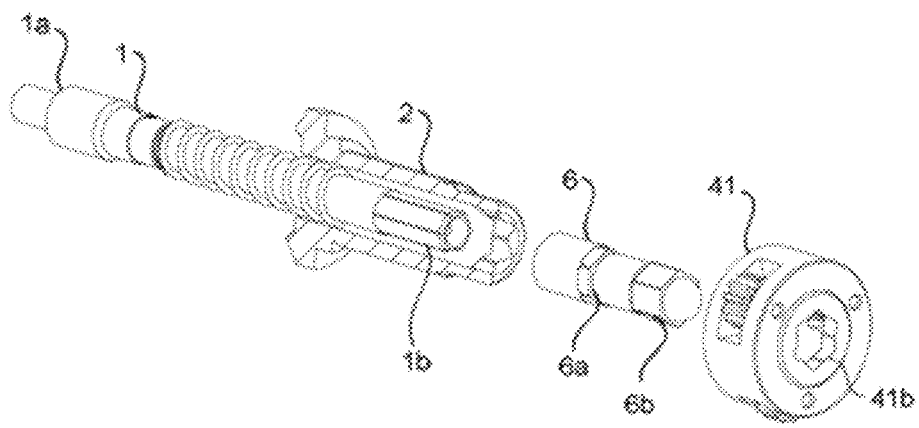
FIG. 2 is a first perspective view of some of the components of an exemplary transmission according to one embodiment.

The engagement between the coupling sleeve 6 and, as in the first mode, the driven member 1 and in the second mode, the planet carrier 41 will now be described with reference to FIG. 2 showing the sleeve 6, the planet carrier 41, driving member 2, and the driven member 1 in a perspective view.

As may be seen from FIGS. 1 and 2, the driven member 1 is supported at a first end 1a by a bearing 50 and at a second end comprises a first engaging portion 1b. The planet wheel carrier 41 similarly comprises a second engaging portion 41b. These engaging portions 1b and 41b are adapted to engage a corresponding first 6a and second 6b portion of the coupling sleeve 6, with the respective interacting surfaces each having a congruent shape, such as in the illustrated embodiment, a hex-shape in both instances.

In operation, the power tool of the illustrated embodiment forms part of a system comprising an external control unit (not shown) operative to control the tool.

The coupling sleeve 6 is initially biased towards the first position to perform run down—i.e. low torque/high speed mode. It follows that the push bar 13, as well, is in a back position where the coupling sleeve 6 connects the driving member with the output shaft OS, FIG. 1.

Run down ends when snug is reached. In the illustrated embodiment this is identified by the external control unit when a current limit threshold is passed. As the linear actuator receives a signal that run down is complete, displacement forwards of the push bar 13 and hence the coupling sleeve 6 towards the second position is started.

The position of the push bar 13 and hence the position of the coupling sleeve 6 is monitored by the internal hall sensor, such that it may be determined when the coupling sleeve engages the planetary gear, i.e. has reached the second position. A signal is sent to the external control unit and the final and actual tightening phase (i.e. high torque/low speed mode) starts. If however, the respective hex-shaped congruent cross sections 6a of the coupling sleeve 6 and the planet carrier misalign and the sleeve 6 fails to engage the planet wheel carrier 41, the linear actuator effects a linear motion in a reverse direction (i.e. backwards). The forward movement is then repeated, but combined with a simultaneous slow rotation of the motor and hence the carrier 41 to allow for a new position to facilitate engagement. The skilled person realizes that the forward movement and the rotation may be executed as consecutive steps as well.

During final tightening, the torque is monitored by a torque transducer (not shown) and when the desired torque is reached, the linear actuator 13, 14 receives a signal, and the push bar 13 moves backwards to allow the sleeve 6 to engage high speed/low torque mode again. This movement of the coupling sleeve 6 may be combined with a simultaneous rotation of the motor to help the coupling sleeve to engage properly as described above.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A power tool comprising:
   a housing;
   an input shaft;
   an output shaft; and
   a two-speed power transmission, said two-speed power transmission comprising a planetary gear and a two-speed gear shift assembly for directing torque through said planetary gear in a high torque/low speed drive mode or past said planetary gear in a low torque/high speed drive mode, wherein said gear shift assembly comprises:
- a driving member drivingly connected to said input shaft;
- a driven member drivingly connected to said output shaft;
- an axially movable coupling sleeve arranged in a first position to intercouple said driving member and said driven member and in a second position to intercouple said planetary gear and said driven member;
- a linear actuator arranged to displace said coupling sleeve between said first and second positions, wherein said linear actuator comprises a linearly movable push bar arranged to for displacing said coupling sleeve between said first and second positions; and
- a coupling assembly arranged between said coupling sleeve and said linear actuator, wherein said coupling assembly comprises a first element rotationally coupled to said sleeve, wherein a rotation of said first element is independent of a rotation of said push bar and wherein said push bar is arranged to push said first element in an axial direction, and wherein said coupling sleeve is concentrically arranged with respect to said planetary gear and wherein said push bar is adapted to engage said first element in a position lying in a center of said sleeve.

2. A power tool according to claim 1, wherein said first element is a ball arranged at least partly in said sleeve.

3. A power tool according to claim 1, wherein a first axially acting spring means is arranged for biasing said coupling sleeve toward said first position of said coupling sleeve.

4. A power tool according to claim 1, wherein said first and second positions are respectively a first and a second end position, and wherein said coupling sleeve is continuously movable therebetween and may be positioned at any position between said first and second end positions.

5. A power tool according to claim 1, wherein said driven member comprises a first engaging portion adapted to engage a corresponding congruent first portion of said coupling sleeve, and wherein said planetary gear comprises a planet wheel carrier comprising a second engaging portion adapted to engage a corresponding congruent second portion of said coupling sleeve.

6. A power tool according to claim 5, wherein at least one of said first and second engaging positions have a polygonal cross section.

7. A power tool according to claim 1, further comprising a bevel gear arranged between said input shaft and said driving member, such that said driving member is connected to said input shaft via said bevel gear.

8. A power tool according to claim 1, wherein said linear actuator is a linear DC servo motor comprising a solid stator housing, a coil assembly, and a multi-pole magnetic push rod.

9. A power tool according to claim 1, wherein said linear actuator comprises at least one internal position sensor configured to sense a position of said push bar.

10. A power tool according to claim 1, wherein said planetary gear is a first planetary gear step.

11. A two-speed power transmission for a power tool comprising a housing, an input shaft, and an output shaft, said two-speed power transmission comprising a planetary gear and a two-speed gear shift assembly for directing torque through said planetary gear in a high torque/low speed drive mode or past said planetary gear in a low torque/high speed drive mode;

said gear shift assembly comprising:
- a driving member drivingly connected to said input shaft;
- a driven member drivingly connected to said output shaft;
- a coupling sleeve arranged in a first position to intercouple said driving member and said driven member and in a second position to intercouple said planetary gear and said driven member;
- a linear actuator arranged to displace said coupling sleeve between said first and second positions, wherein said linear actuator comprises a linearly movable push bar arranged to for displacing said coupling sleeve between said first and second positions; and
- a coupling assembly arranged between said coupling sleeve and said linear actuator, wherein said coupling assembly comprises a first element rotationally coupled to said sleeve, wherein a rotation of said first element is independent of a rotation of said push bar and wherein said push bar is arranged to push said first element in an axial direction, and wherein said coupling sleeve is concentrically arranged with respect to said planetary gear and wherein said push bar is adapted to engage said first element in a position lying in a center of said sleeve.

12. A method for use of a power tool according to claim 1, said method comprising the steps of:
- running the power tool in the low torque/high speed drive mode of operation in which the coupling sleeve is arranged in a first position directing torque past said planetary gear;
- identifying that a snug position for an implement driven by the power tool has been reached;
- displacing said coupling sleeve forwards by an axial movement in a first direction by means of said linear actuator to arrive at said second position; and
- running the tool in the high torque/low speed drive mode of operation in which the coupling sleeve is arranged in the second position directing torque through said planetary gear.

13. A method according to claim 12, wherein the step of displacing said coupling sleeve forwards to arrive at said second position further comprises, if said coupling sleeve fails to engage said planetary gear:
- effecting a displacement of said coupling sleeve backwards by an axial movement in a second opposite direction of said linear actuator;
- effecting a rotation of said planetary gear; and
- effecting a displacement of said coupling sleeve forwards by an axial movement in said first direction of said linear actuator to arrive at said second position.

* * * * *